US009902889B2

(12) United States Patent
Kim et al.

(10) Patent No.: US 9,902,889 B2
(45) Date of Patent: Feb. 27, 2018

(54) ALUMINA COMPOSITE CERAMIC COMPOSITION AND METHOD OF MANUFACTURING THE SAME

(71) Applicant: Korea Institute of Ceramic Engineering & Technology, Gyeongsangnam-do (KR)

(72) Inventors: Hyo Tae Kim, Gyeongsangnam-do (KR); Hyo Soon Shin, Gyeonggi-do (KR); Chi Heon Kim, Gyeongsangnam-do (KR)

(73) Assignee: Korea Institute of Ceramic Engineering & Technology, Gyeongsangnam-do (KR)

( * ) Notice: Subject to any disclaimer, the term of this patent is extended or adjusted under 35 U.S.C. 154(b) by 15 days.

(21) Appl. No.: 15/054,492

(22) Filed: Feb. 26, 2016

(65) Prior Publication Data

US 2017/0152424 A1    Jun. 1, 2017

(30) Foreign Application Priority Data

Nov. 26, 2015  (KR) .................. 10-2015-0166339

(51) Int. Cl.
*C04B 35/117*  (2006.01)
*C04B 35/64*   (2006.01)
(Continued)

(52) U.S. Cl.
CPC .............. *C09K 5/14* (2013.01); *C04B 35/013* (2013.01); *C04B 35/10* (2013.01); *C04B 35/64* (2013.01);
(Continued)

(58) Field of Classification Search
CPC .... H01B 1/00; H01B 1/04; H01B 1/08; C04B 35/10; C04B 35/117; C01B 31/00; C01F 7/02; C01F 7/021
See application file for complete search history.

(56) References Cited

U.S. PATENT DOCUMENTS

| | | | |
|---|---|---|---|
| 6,001,760 | A | 12/1999 | Katsuda et al. |
| 6,884,742 | B2 | 4/2005 | Katsuda et al. |
| 2003/0153452 | A1 | 8/2003 | Katsuda et al. |

FOREIGN PATENT DOCUMENTS

| | | |
|---|---|---|
| JP | S6346032 A | 2/1988 |
| JP | 09-315867 | 12/1997 |
| KR | 10-0494188 B1 | 6/2005 |

OTHER PUBLICATIONS

Liu et al "Toughening of zirconia/alumina composites . . . ", Journal of the European Ceramic Society 32 (2012) 4185-93.*

(Continued)

*Primary Examiner* — Mark Kopec
(74) *Attorney, Agent, or Firm* — The H.T. Than Law Group

(57) ABSTRACT

Provided is an alumina composite ceramic composition which has electrical insulation properties as well as better mechanical strength and thermal conductivity than a typical alumina-based material. Thus, the alumina composite ceramic composition is promising for a material of a substrate or an insulating package of an electronic device. The alumina composite ceramic composition of the present invention may include alumina ($Al_2O_3$), zirconia ($ZrO_2$) or yttria-stabilized zirconia as a first additive, and graphene oxide and carbon nanotubes, as a second additive. In this case, in consideration of two aspects of sinterability and electrical resistivity characteristics of the alumina composite ceramic composition, the graphene oxide may be appropriately adjusted to be in the form of a graphene oxide phase and a reduced graphene phase which coexist in the alumina composite ceramic composition.

16 Claims, 1 Drawing Sheet

(51) Int. Cl.
*C09K 5/14* (2006.01)
*C04B 35/01* (2006.01)
*C04B 35/10* (2006.01)

(52) U.S. Cl.
CPC .............. *C04B 2235/3217* (2013.01); *C04B 2235/3244* (2013.01); *C04B 2235/3246* (2013.01); *C04B 2235/34* (2013.01); *C04B 2235/5288* (2013.01)

(56) References Cited

OTHER PUBLICATIONS

Yazdani et al "Tribological performance of graphene/carbon nanotube hybrid . . . ", Scientific Reports 5:11579, pub Jun. 23, 2015.*
Yazdani et al "Graphene and carbon nanotube (GNT)-reinforced alumina nanocomposites", Journal of the European Ceramic Society 35 (2015) 179-86.*
Ahmad et al "Recent advances on carbon nanotubes and graphene reinforced ceramics nanocomposites", Nanomaterials 2015, 5, 90-114.*
Rincon et al "Tape casting of alumina/zirconia suspensions containing graphene oxide", Journal of the European Ceramic Society 34 (2014) 1819-27.*
Zhu et al "Graphene and graphene oxide: synthesis, properties, and applications", Adv. Mater. 2010, 22, 3906-3924.*
English translation of abstract of JP 09-315867, 1997.
Laid open publication of KR 10-0494188, 2005.

* cited by examiner

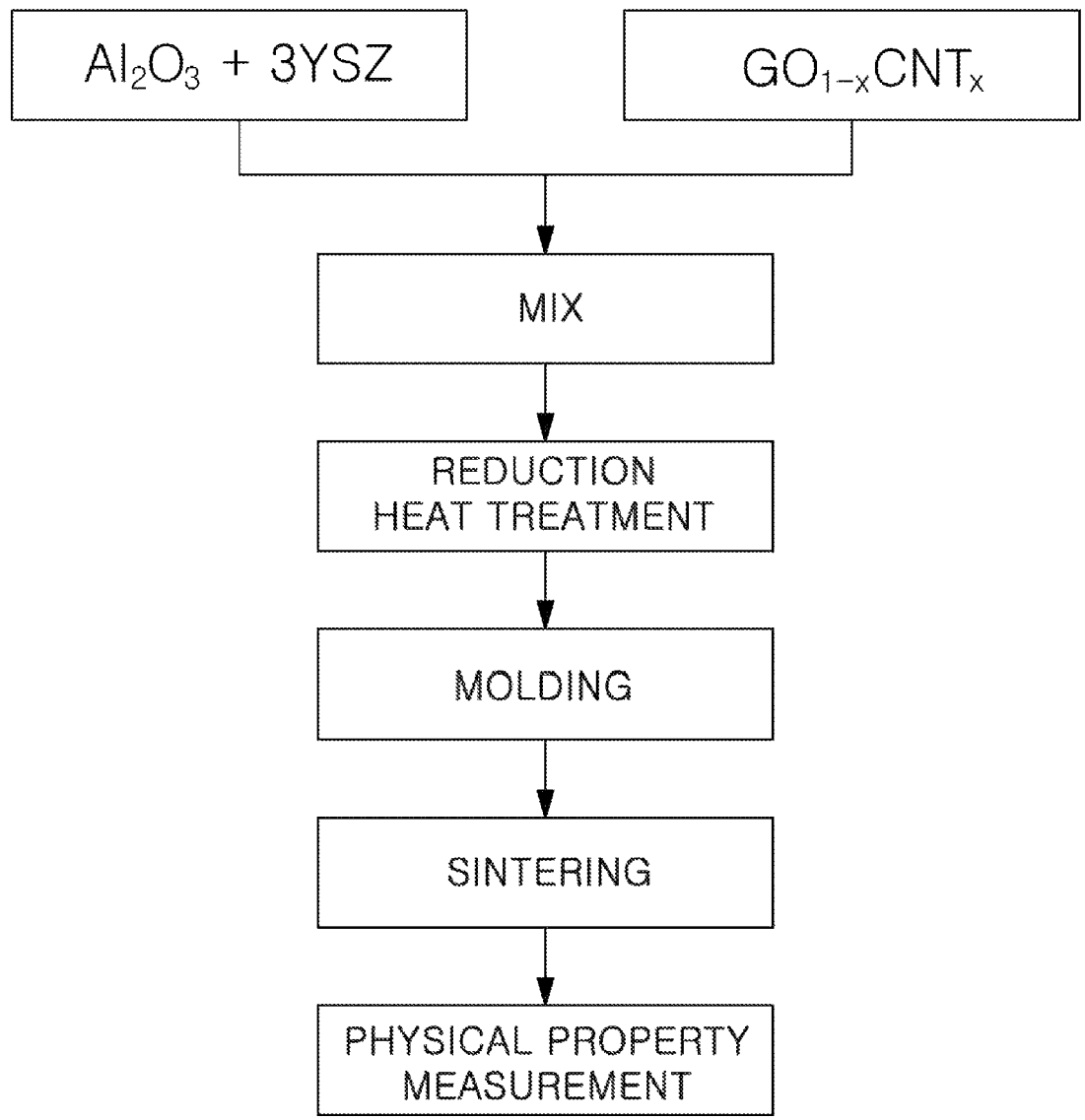

ALUMINA COMPOSITE CERAMIC COMPOSITION AND METHOD OF MANUFACTURING THE SAME

CROSS-REFERENCE TO RELATED APPLICATION

This application claims priority to Korean Patent Application No. 10-2015-0166339 filed on Nov. 26, 2015 and all the benefits accruing therefrom under 35 U.S.C. § 119, the contents of which are incorporated by reference in their entirety.

The present invention is derived from the financial support from the R&D Convergence Program of MSIP (Ministry of Science, ICT and Future Planning) and NST (National Research Council of Science & Technology) of the Republic of Korea [Grant CAP-13-02-ETRI (171100697), Contribution rate: 1/1].

BACKGROUND

The present invention relates to an alumina composite ceramic composition, and more particularly, to an alumina composite ceramic composition having electrical insulation properties as well as excellent mechanical strength and good thermal conductivity.

Also, the present invention relates to a method of manufacturing the alumina composite ceramic composition.

Recently, ceramics, such as beryllia, silicon nitride, and aluminum nitride, have been developed as alternative materials to alumina, in addition to the alumina which has mainly been used as a material of an insulating substrate for the dissipation of heat generated from various electronic components.

Since alumina ($Al_2O_3$) among oxide ceramics may be sintered in an air atmosphere and simultaneously has a high thermal conductivity of 10 W/m·K or more, the alumina is suitable for the material of the insulating substrate. However, in order for the alumina to be used as the substrate material, sintering at a high temperature of 1,600° C. or more is typically required, and sintering at a high temperature of at least 1,500° C. or more is required even if a sintering aid is added to the alumina. Typical alumina manufactured as described above may generally have a thermal conductivity of 18 W/m·K to 23 W/m·K.

Also, among the alternative materials of the alumina, since aluminum nitride (AlN) particularly has excellent electrical insulation properties, high thermal conductivity, and a thermal expansion coefficient relatively close to that of silicon, it may be expected that the silicon nitride, for example, may be used as a substrate for a high-power hybrid IC. The thermal conductivity of the aluminum nitride is generally about 170 W/m·K, and may reach a maximum of 230 W/m·K.

As the related art of a method of manufacturing aluminum nitride, Japanese Patent Publication No. S63-46032 (published on Feb. 26, 1988), entitled "Method of Manufacturing High Thermal Conductivity Aluminum Nitride Sintered Body" discloses that trace amounts of oxides of yttrium, lanthanum, praseodymium, niobium, samarium, gadolinium, and dysprosium were added to aluminum nitride as a main component and hot pressing was performed at a temperature of 1,600° C. to 1,800° C. to obtain thermal conductivity close to 121 W/m·K. Also, Japanese Patent Application Laid-Open Publication No. H09-315867 (published on Dec. 9, 1997), entitled "Aluminum Nitride Sintered Compact, Metal Embedded Article, Electronic Functional Material and Electrostatic Chuck" discloses that a trace amount of yttrium oxide was added to high-purity aluminum nitride and hot pressing was performed at a maximum temperature of 1,750° C. to 2,300° C. to obtain a thermal conductivity of 80 W/m·K to 100 W/m·K. Furthermore, Korean Patent No. 10-0494188 (published on Jun. 10, 2005), entitled "Aluminum Nitride Ceramics, Members for Use in a System for Producing Semiconductors, Corrosion-resistant Members and Conductive Members" discloses that a predetermined amount of boron carbide was added to a raw material of an aluminum nitride sintered body and sintering was performed at a temperature of 1,700° C. to 2,200° C. to obtain a maximum thermal conductivity of 135 W/m·K.

As described above, although aluminum nitride has high thermal conductivity, the manufacturing costs of the aluminum nitride are very high due to the fact that a high temperature of about 1,700° C. or more is required to obtain a dense sintered body and sintering in a reducing atmosphere using e.g., nitrogen gas or hydrogen-nitrogen mixed gas is essentially required because the aluminum nitride is a nitride that is easily oxidized during a high-temperature heat treatment. Furthermore, the price of aluminum nitride raw material powder is relatively more expensive than that of a typical oxide. As a result, since an aluminum nitride sintered body is more expensive than an alumina sintered body, the aluminum nitride sintered body is not practical as the material of the insulating substrate.

In terms of mechanical strength, the above-described alumina and an alumina-based material mostly have mechanical strength (denotes a flexural strength in the present specification) only up to 280 MPa to 350 MPa.

Thus, a material having more improved mechanical strength and thermal conductivity than the typical alumina-based material is required.

SUMMARY

The present invention provides an alumina composite ceramic composition having electrical insulation properties as well as better mechanical strength and thermal conductivity than a typical alumina-based material, and a method of manufacturing the alumina composite ceramic composition.

In accordance with an aspect of the present invention, an alumina composite ceramic composition may include: alumina ($Al_2O_3$); zirconia ($ZrO_2$) or yttria-stabilized zirconia as a first additive; and graphene oxide; and carbon nanotubes, as a second additive.

In this case, an amount of the first additive may be 30 wt % or less based on a weight of the alumina and may be 10 wt % or more based on the weight of the alumina.

Also, an amount of the second additive may be 2.0 wt % or less based on a total weight of the alumina and the first additive and may be 0.5 wt % or more based on the total weight of the alumina and the first additive.

Furthermore, the graphene oxide may be in the form of a graphene oxide phase and a reduced graphene phase which coexist in the alumina composite ceramic composition.

In accordance with another aspect of the present invention, a method of manufacturing an alumina composite ceramic composition may include:

mixing alumina ($Al_2O_3$) and zirconia ($ZrO_2$) or yttria-stabilized zirconia, as a first additive, to form a first mixture;

adding graphene oxide and carbon nanotubes, as a second additive, to the first mixture and mixing to form a second mixture; and molding and sintering the second mixture.

In this case, the sintering may be performed at a temperature of 1,600° C. to 1,750° C. and may be performed for 4 hours or less at the above temperature. In this case, the sintering may be performed in a nitrogen ($N_2$) gas atmosphere or a mixed gas atmosphere of nitrogen ($N_2$) and hydrogen ($H_2$), and an amount of the hydrogen in the mixed gas atmosphere of nitrogen ($N_2$) and hydrogen ($H_2$) may be in a range of 0.5 wt % to 3.0 wt % based on a total weight of the mixed gas.

Also, the second mixture may be heat-treated at a temperature of 350° C. to 400° C. before the molding and at least a portion of the graphene oxide may be reduced. In this case, the heat treatment may be performed in an air atmosphere or a $N_2$ atmosphere and may be performed for 1 hour or less.

Furthermore, in the sintering and the heat treatment, the atmosphere may promote reduction of the graphene oxide and may adjust a ratio of an amount of the graphene oxide reduced to an amount of the graphene oxide not reduced to obtain a predetermined range of resistivity of the alumina composite ceramic composition. Also, the atmosphere may be adjusted so that the graphene oxide is in the form of a graphene oxide phase and a reduced graphene phase which coexist in the sintered alumina composite ceramic composition.

The graphene oxide and the carbon nanotubes may be respectively added to the first mixture in the form of an aqueous solution, and the aqueous solutions may be prepared by respectively dispersing 0.5 wt % to 1 wt % of the graphene oxide and 0.5 wt % to 1 wt % of the carbon nanotubes in water. In this case, the second additive may include a mixture of the graphene oxide and the carbon nanotubes.

Hereinafter, the present invention will be described in detail.

BRIEF DESCRIPTION OF THE DRAWINGS

Exemplary embodiments can be understood in more detail from the following description taken in conjunction with the accompanying drawings, in which:

FIG. 1 is a flowchart schematically illustrating a method of manufacturing an alumina composite ceramic composition in accordance with an exemplary embodiment.

DETAILED DESCRIPTION OF EMBODIMENTS

Hereinafter, specific embodiments will be described in detail with reference to the accompanying drawings.

The present invention provides an alumina composite ceramic composition having electrical insulation properties as well as more improved mechanical strength and thermal conductivity than a typical alumina-based material.

A method of manufacturing the composite ceramic composition in accordance with an exemplary embodiment of the present invention is schematically illustrated in FIG. 1.

First, in the present invention, mechanical strength is increased by adding zirconia ($ZrO_2$) or yttria-stabilized zirconia to alumina ($Al_2O_3$) as a basic composition. In the present invention, conventional yttria-stabilized zirconia ("3YSZ"), in which 3 mol % of $Y_2O_3$ is added to zirconia, may be used as the yttria-stabilized zirconia, but the present invention is not limited thereto.

The zirconia ($ZrO_2$) or the yttria-stabilized zirconia (3YSZ) is mixed in an amount of 30 wt % or less, preferably 10 wt % to 30 wt %, based on a weight of the alumina ($Al_2O_3$) to form an alumina+zirconia mixed matrix.

However, in this case, although the mechanical strength increases as intended, thermal conductivity of the zirconia added is low at about 4 W/mK. Thus, thermal conductivity of the manufactured composite ceramic composition will be significantly reduced.

In consideration of this, in the present invention, the reduction of the thermal conductivity of the composite ceramic composition may be buffered and the mechanical strength may be further improved by adding graphene oxide ("GO") and carbon nanotubes ("CNT") to the alumina+zirconia mixed matrix.

That is, according to the addition of the GO and CNT, the mechanical strength of the composite ceramic composition may be increased due to excellent mechanical strengths of graphene ("G") and the oxide GO themselves, crack detour function of a GO nanosheet, and intergranular clutch function by a transgranular insertion structure as well as matrix intergranular bridging function of CNT.

The GO and CNT are in the form in which an amount ratio (wt %) of GO/CNT is in a range of 0 to 1, wherein the GO and CNT may be added to the alumina+zirconia mixed matrix in a maximum amount of 2.0 wt %, preferably in an amount of 0.5 wt % to 2.0 wt %, based on a weight of the mixed matrix. According to an exemplary embodiment, the GO and CNT may be respectively provided as solutions, in which 0.5 wt % to 1 wt % of the GO and 0.5 wt % to 1 wt % of the CNT are respectively dispersed in pure water (deionized (DI) water), and mixed, and a mixed solution may then be added to alumina powder and mixed.

Also, in the present invention, the composite composition thus prepared may be sintered at a temperature of 1,600° C. to 1,750° C. for 4 hours or less, and may be molded by a conventional molding process, such as pressing, before the sintering. According to an exemplary embodiment, the sintering may be performed in a nitrogen ($N_2$) gas atmosphere or a mixed gas atmosphere of nitrogen ($N_2$) and hydrogen ($H_2$), and an amount of the hydrogen may be in a range of about 0.5 wt % to about 3.0 wt % based on a total weight of the mixed gas.

In the present invention, the composite composition may be heat-treated at a temperature of 350° C. to 400° C. for at least 1 hour in an air or a $N_2$ atmosphere as a pretreatment before the sintering process. Since the GO mixed in the zirconia or yttria-stabilized zirconia/alumina composite matrix is partially reduced and the density of the composite ceramic is increased by the pretreatment, porosity may be particularly reduced. As a comparative example, in a case in which the GO is mixed in the composite matrix and then sintered without the above-described pretreatment, it is observed that a large amount of pores is generated to significantly reduce the densification. Here, the presence of the reduction of the Go may be confirmed by conventional Raman spectroscopy.

However, in the present invention, since the G is electrically conductive whereas the GO is electrically insulating, it is desirable to maintain an appropriate ratio of these additives contained in the composite matrix in order to maintain predetermined insulating properties which are required depending on the use. Thus, it is desirable to control the atmosphere so that the GO is not completely reduced, but G and GO phases coexist by the pretreatment and the sintering to allow a sintered body to have an appropriate resistance value.

Hereinafter, exemplary embodiments of the present invention will be described in more detail. The following examples are merely provided to allow for a clearer understanding of the present invention, rather than to limit the scope thereof.

EXAMPLES (A) Manufacture of Composite Composition Powder

First, as a matrix, alumina powder having a purity of 99% or more and an average particle diameter of 150 nm and 3 mol % yttria-doped zirconia powder (3YSZ) having an average particle diameter of 30 nm to 50 nm were mixed, wherein the 3YSZ powder was included in an maximum amount of 40 wt %, for example, 0 wt %, 10 wt %, 20 wt %, 30 wt %, and 40 wt %, based on a weight of the alumina powder.

As an additive for improving mechanical strength and thermal conductivity, graphene oxide (GO) and carbon nanotubes (CNT) were respectively added to the matrix in a maximum amount of 2.0 wt % based on a weight of the alumina+zirconia mixed matrix, wherein the GO and the CNT were mixed in a weight ratio of 1:0, 1:3, 1:1, 3:1, and 0:1, among GO/CNT ratios of 0 to 1. In this case, the GO used in the present embodiment is flake-shaped nanopowder having a particle diameter of 0.5 μm to 5 μm, but the present invention is not limited thereto and bulk or acicular nanopowder may also be used. Also, the CNT used in the present embodiment has a diameter of 50 nm and a length of 20 μm to 50 μm, but the present invention is not limited to the above numerical range.

An amount of the alumia/zirconia was weighed at a predetermined ratio as described above, and the GO/CNT was also simultaneously added to a jar for ball milling. In this case, since the GO and the CNT are conventionally difficult to be handled in the form of powder, the GO and the CNT were respectively prepared as 0.5 wt % to 1 wt % aqueous solutions to be mixed with the alumia/zirconia, wherein the viscosity of a slurry for ball milling was adjusted by separately adding ethanol. As ball milling conditions, zirconia balls having a diameter of 0.3 mm to 10 mm were used in a HDPE jar, a rotational speed of ball mill was 130 rpm, and the ball milling was performed for 6 hours. Thereafter, the slurry was put in a glass container and dried in an oven, and the dried slurry was then ground with a mortar.

(B) Pretreatment

The dried and ground powder was introduced into an alumina crucible and heat-treated at 400° C. for 1 hour in a $N_2$ atmosphere to partially reduce the GO.

(C) Molding and Sintering

A 2 wt % PVA aqueous solution was sprayed and mixed with the pretreated alumina/zirconia ($Al_2O_3$/3YSZ)+carbon material (GO/CNT) mixed powder or the mixture was granulated and then molded at a pressure of 98 MPa. In this case, two types of molded samples were prepared in which the sample for measuring thermal conductivity was molded to have a diameter of 12.5 mm and a thickness of 1 mm to 2 mm, and the sample for measuring mechanical strength, i.e., 3-point flexural strength, was molded in the form of a bar with a size of 3×4×40 $mm^3$.

The molded samples were loaded on a zirconia setter in a furnace for adjustable atmospheres, first subjected to a binder removal process at 400° C. for 1 hour, heated to a sintering temperature of 1,600° C. to 1,750° C. at a heating rate of 5° C./minute and maintained for 4 hours, and cooled to room temperature at a cooling rate of 10° C./minute. In this case, a sintering atmosphere was a mixed gas of 2.85 wt % $H_2$ and $N_2$.

(D) Physical Property Measurement

Diameter, thickness, density, and specific heat of the composite ceramic composition samples after completion of the sintering were first measured in order to measure thermal conductivity. The corresponding samples were coated with carbon, thermal diffusivity was measured by a conventional laser flash method (equipment used: Netzsch LFA 447), and the thermal conductivity was obtained according to a calculation formula of thermal diffusivity×density×specific heat [W/m·K]. Also, mechanical strengths of the composite ceramic composition samples were measured by using a conventional 3-point flexural strength measurement method (equipment used: universal testing machine (UTM)).

Hereinafter, various properties of the composite ceramic compositions of the present invention thus obtained will be examined as follows:

First, the following Table 1 lists physical properties of alumina/3YSZ composite ceramic compositions which were prepared on a trial basis before the manufacture of the compositions of the present invention. These test composition samples were manufactured by the above-described method, but were sintered at a sintering temperature of 1,600° C.,

TABLE 1

Physical Properties of alumina/3YSZ Composite Ceramic Compositions

| Test compositions | Composite compositions (wt %) | | Physical properties (1,600° C.) | | |
|---|---|---|---|---|---|
| | Matrix $Al_2O_3$ | Secondary phase 3YSZ | Sintered density (g/cc) | 3-point flexural strength (MPa) | Thermal conductivity (W/mK) |
| 1 | 100 | 0 | 3.91 | 283 | 38.71 |
| 2 | 90 | 10 | 4.11 | 360 | 30.92 |
| 3 | 80 | 20 | 4.33 | 352 | 24.56 |
| 4 | 70 | 30 | 4.50 | 382 | 22.39 |
| 5 | 60 | 40 | 4.70 | 368 | 17.61 |

Referring to Table 1, when the amount of the 3 YSZ in the alumina/3YSZ composite compositions was in a range of 20 wt % to 30 wt %, density close to 4.54 g/cc, a theoretical density (% TD) of a typical zirconia-containing alumina composite, was obtained. In contrast, when the amount of the zirconia was greater than 30 wt %, it may be understood that the thermal conductivity of the composite was significantly reduced.

Accordingly, in the present invention which is intended to improve the sintered density, flexural strength, and thermal conductivity, it may be considered that an appropriate amount of the zirconia (i.e., herein, 3YSZ) was in a range of 10 wt % to 30 wt %.

The following Table 2 lists sintered densities according to each composition ratio of the [alumina/3YSZ]+[GO/CNT] composite ceramic composition samples according to the present invention, i.e., sintered density characteristics according to an amount of the GO/CNT mixture added to the alumina/3YSZ and a mixing ratio of the GO/CNT. These samples were also manufactured by the above-described method, and an amount ratio (wt %) of 3YSZ/alumina was 20/80.

TABLE 2

Sintered Density of [alumina/3YSZ] + [GO/CNT] Composite Ceramic Composition

| Composition samples | Composite compositions (wt %) | | Mixing ratio of GO/CNT (weight ratio) | Sintered density | | |
|---|---|---|---|---|---|---|
| | Matrix 20YSZ/80Al$_2$O$_3$ | Additive GO/CNT | | 1,650° C. g/cc | 1,700° C. g/cc | 1,750° C. g/cc |
| Comparative Example | 100 | 0 | — | 4.40 | — | — |
| Example 1 | 99.5 | 0.5 | 1:0 | 4.46 | — | — |
| Example 2 | | | 3:1 | 4.41 | — | — |
| Example 3 | | | 1:1 | 4.38 | — | — |
| Example 4 | | | 1:3 | 4.39 | — | — |
| Example 5 | | | 0:1 | 4.38 | — | — |
| Example 6 | 99 | 1.0 | 1:0 | 4.36 | 4.32 | 4.38 |
| Example 7 | | | 3:1 | 4.39 | 4.35 | 4.39 |
| Example 8 | | | 1:1 | 4.37 | 4.35 | 4.40 |
| Example 9 | | | 1:3 | 4.43 | 4.34 | 4.46 |
| Example 10 | | | 0:1 | 4.34 | 4.27 | 4.38 |
| Example 11 | 98 | 2.0 | 1:0 | 4.24 | — | — |
| Example 12 | | | 3:1 | 4.35 | — | — |
| Example 13 | | | 1:1 | 4.39 | — | — |
| Example 14 | | | 1:3 | 4.36 | — | — |
| Example 15 | | | 0:1 | 4.41 | — | — |

Referring to Table 2, sintered densities of 4.24 g/cc to 4.46 g/cc were obtained at almost all of the composition ratios of the compositions of the present invention when sintered in a temperature range of 1,650° C. to 1,750° C., and these corresponded to densities of 93.4% to 98.2% relative to the theoretical density. Thus, it may be understood that the compositions of the present invention have excellent sinterability.

Also, it was observed that there was no big difference in the sintered densities according to each sintering temperature in a temperature range of 1,650° C. to 1,750° C.

Accordingly, in Tables 3 to 5 as well as Table 2, characteristics data at two sintering temperatures of 1,700° C. and 1,750° C. were provided only for the compositions having a mixing ratio of [alumina/3YSZ]:[GO/CNT] of 99:1 and, with respect to the other compositions, data only at a sintering temperature of 1,650° C. were provided.

The following Table 3 lists 3-point flexural strength characteristics according to each composition ratio of the [alumina/3YSZ]+[GO/CNT] composite ceramic composition samples according to the present invention. These samples were the same as the samples of Table 2.

TABLE 3

3-point Flexural Strength of [alumina/3YSZ] + [GO/CNT] Composite Ceramic Composition

| Composition samples | Composite compositions (wt %) | | Mixing ratio of GO/CNT (weight ratio) | 3-point flexural strength (MPa) | | |
|---|---|---|---|---|---|---|
| | Matrix 20YSZ/80Al$_2$O$_3$ | Additive GO/CNT | | Sintering temperature | | |
| | | | | 1,650° C. | 1,700° C. | 1,750° C. |
| Comparative Example | 100 | 0 | — | 308 | — | — |
| Example 1 | 99.5 | 0.5 | 1:0 | 593 | — | — |
| Example 2 | | | 3:1 | 722 | — | — |
| Example 3 | | | 1:1 | 679 | — | — |
| Example 4 | | | 1:3 | 629 | — | — |
| Example 5 | | | 0:1 | 556 | — | — |
| Example 6 | 99 | 1.0 | 1:0 | 286 | 533 | 531 |
| Example 7 | | | 3:1 | 491 | 589 | 546 |
| Example 8 | | | 1:1 | 561 | 604 | 584 |
| Example 9 | | | 1:3 | 532 | 587 | 563 |
| Example 10 | | | 0:1 | 649 | 668 | 622 |
| Example 11 | 98 | 2.0 | 1:0 | 307 | — | — |
| Example 12 | | | 3:1 | 344 | — | — |
| Example 13 | | | 1:1 | 624 | — | — |
| Example 14 | | | 1:3 | 581 | — | — |
| Example 15 | | | 0:1 | 520 | — | — |

Referring to Table 3, it may be understood that 3-point flexural strengths of the compositions of the present examples were significantly increased according to the addition of the GO/CNT. That is, the composition of the comparative example, in which the GO/CNT was not added, had a 3-point flexural strength of 308 MPa, but the 3-point flexural strengths of the compositions of the present examples were increased to 722 MPa according to the addition of the GO/CNT and thus, an improvement of about 234% was obtained. A mechanism of improving the mechanical strength according to the addition of the GO/CNT was previously described.

The following Table 4 lists thermal conductivity characteristics according to each composition ratio of the [alumina/3YSZ]+[GO/CNT] composite ceramic composition samples according to the present invention. These samples were the same as the samples of Table 2.

TABLE 4

Thermal Conductivity of [alumina/3YSZ] + [GO/CNT] Composite Ceramic Composition

| Composition samples | Composite compositions (wt %) | | Mixing ratio of GO/CNT (weight ratio) | Thermal conductivity (W/m · K) | | |
|---|---|---|---|---|---|---|
| | Matrix 20YSZ/80Al$_2$O$_3$ | Additive GO/CNT | | Sintering temperature | | |
| | | | | 1,650° C. | 1,700° C. | 1,750° C. |
| Comparative Example | 100 | 0 | — | 18.41 | 18.32 | 18.24 |
| Example 1 | 99.5 | 0.5 | 1:0 | 19.39 | — | — |
| Example 2 | | | 3:1 | 20.60 | — | — |
| Example 3 | | | 1:1 | 20.83 | — | — |
| Example 4 | | | 1:3 | 21.29 | — | — |
| Example 5 | | | 0:1 | 19.61 | — | — |
| Example 6 | 99 | 1.0 | 1:0 | 19.51 | 16.80 | 18.43 |
| Example 7 | | | 3:1 | 21.67 | 18.87 | 18.97 |
| Example 8 | | | 1:1 | 21.54 | 18.61 | 19.99 |
| Example 9 | | | 1:3 | 23.10 | 18.87 | 21.15 |
| Example 10 | | | 0:1 | 22.04 | 17.94 | 20.60 |
| Example 11 | 98 | 2.0 | 1:0 | 20.19 | — | — |
| Example 12 | | | 3:1 | 20.90 | — | — |
| Example 13 | | | 1:1 | 20.23 | — | — |
| Example 14 | | | 1:3 | 22.81 | — | — |
| Example 15 | | | 0:1 | 20.54 | — | — |

Referring to Table 4, thermal conductivities of the present examples, in which the GO/CNT was added, were increased in comparison to the composition of the comparative example in which the GO/CNT was not added, and the thermal conductivities were in a range of about 19 W/m·K to about 23 W/m·K. It was considered that the thermal conductivities were due to the coexistence of the G and GO phases in partially oxidized graphene and the contributions from high thermal conductivity of the G phase among the materials and thermal conductivity of the CNT material. When the sintering temperature was excessively increased, the thermal conductivity was somewhat decreased.

The following Table 5 lists resistivity characteristics according to each composition ratio of the [alumina/3YSZ]+[GO/CNT] composite ceramic composition samples according to the present invention. These samples were the same as the samples of Table 2.

TABLE 5

Resistivity value of [alumina/3YSZ] + [GO/CNT] Composite Ceramic Composition

| Composition samples | Composite compositions (wt %) | | Mixing ratio of GO/CNT (weight ratio) | Resistivity (Ω · cm) | | |
|---|---|---|---|---|---|---|
| | Matrix 20YSZ/80Al$_2$O$_3$ | Additive GO/CNT | | Sintering temperature | | |
| | | | | 1,650° C. | 1,700° C. | 1,750° C. |
| Comparative Example | 100 | 0 | — | 3.4E11 | — | — |
| Example 1 | 99.5 | 0.5 | 1:0 | 2.8E11 | — | — |
| Example 2 | | | 3:1 | 3.8E11 | — | — |
| Example 3 | | | 1:1 | 4.2E11 | — | — |
| Example 4 | | | 1:3 | 4.2E11 | — | — |
| Example 5 | | | 0:1 | 1.6E11 | — | — |
| Example 6 | 99 | 1.0 | 1:0 | 1.0E11 | 3.1E11 | 5.4E9 |
| Example 7 | | | 3:1 | 9.2E10 | 2.2E11 | 9.4E8 |

TABLE 5-continued

Resistivity value of [alumina/3YSZ] + [GO/CNT] Composite Ceramic Composition

| Composition samples | Composite compositions (wt %) Matrix 20YSZ/80Al$_2$O$_3$ | Additive GO/CNT | Mixing ratio of GO/CNT (weight ratio) | Resistivity ($\Omega \cdot$ cm) Sintering temperature 1,650° C. | 1,700° C. | 1,750° C. |
|---|---|---|---|---|---|---|
| Example 8 | | | 1:1 | 4.7E10 | 1.7E11 | 3.9E8 |
| Example 9 | | | 1:3 | 2.2E10 | 2.3E11 | 3.5E8 |
| Example 10 | | | 0:1 | 1.6E10 | 6.1E11 | 2.7E8 |
| Example 11 | 98 | 2.0 | 1:0 | 8.1E10 | — | — |
| Example 12 | | | 3:1 | 5.7E10 | — | — |
| Example 13 | | | 1:1 | 3.5E10 | — | — |
| Example 14 | | | 1:3 | 1.7E10 | — | — |
| Example 15 | | | 0:1 | 1.4E10 | — | — |

Referring to Table 5, resistivity values of the present examples, in which the GO/CNT was added, were slightly decreased in comparison to the composition of the comparative example in which the GO/CNT was not added, and, since the reduction of the insulating GO was promoted by the effect of a reducing atmosphere as the sintering temperature increased, the resistivity values were reduced.

As described above, since the G is electrically conductive but the GO is electrically insulating, it is desirable to maintain appropriate ratios of these additives contained in the composite matrix in order to maintain predetermined insulating properties which are required depending on the use. Thus, according to the present invention, it is desirable to control the atmosphere so that the GO is not completely reduced, but the G and GO phases coexist by the pretreatment and the sintering to allow the sintered body to have an appropriate resistance value.

Referring to FIG. 5, since a resistivity of at least $10^{10}$ $\Omega \cdot$cm or more was obtained when the sintering temperature was in a range of 1,650° C. to 1,700° C., the [alumina/3YSZ]+[GO/CNT] composite ceramic compositions may be promisingly applicable for a material of a substrate or an insulating package of an electronic device.

As described above, the [alumina/3YSZ]+[GO/CNT] composite ceramic compositions according to the present invention had excellent mechanical strengths, good thermal conductivities, and electrical insulating properties.

An alumina composite ceramic composition according to the present invention has electrical insulation properties as well as better mechanical strength and thermal conductivity than a typical alumina-based material. The alumina composite ceramic composition may be promisingly applicable for a material of a substrate or an insulating package of an electronic device.

It is obvious to those skilled in the art that there may be some variations in various characteristics of the above-described exemplary embodiments of the present invention within a typical margin of error, according to powder characteristics, such as average particle diameter, distribution, and specific surface area of the composition powder, purity of raw materials, amount of impurity added, and sintering conditions.

Although the alumina composite ceramic composition and the method of manufacturing the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An alumina composite ceramic composition comprising:
   alumina (Al$_2$O$_3$);
   zirconia (ZrO$_2$) or yttria-stabilized zirconia as a first additive; and
   graphene (G), graphene oxide (GO) and carbon nanotubes (CNT), as a second additive.

2. The alumina composite ceramic composition of claim 1, wherein an amount of the first additive is 30 wt % or less based on a weight of the alumina.

3. The alumina composite ceramic composition of claim 1, wherein an amount of the second additive is 2.0 wt % or less based on a total weight of the alumina and the first additive.

4. The alumina composite ceramic composition of claim 2, wherein the amount of the first additive is 10 wt % or more based on the weight of the alumina.

5. The alumina composite ceramic composition of claim 3, wherein the amount of the second additive is 0.5 wt % or more based on the total weight of the alumina and the first additive.

6. The alumina composite ceramic composition of claim 1, wherein the yttria-stabilized zirconia has a composition including zirconia and 3 mol % of yttria.

7. A method of manufacturing an alumina composite ceramic composition, the method comprising:
   mixing alumina (Al$_2$O$_3$) and zirconia (ZrO$_2$) or yttria-stabilized zirconia, as a first additive, to form a first mixture;
   adding graphene oxide (GO) and carbon nanotubes (CNT), as a second additive, to the first mixture and mixing to form a second mixture; and
   molding and sintering the second mixture to obtain a sintered body, wherein the sintering is carried out at such a sintering temperature and in such an atmosphere that both graphene (G) phases and graphene oxide (GO) phases coexist in the sintered body.

8. The method of claim 7, wherein the sintering is performed at a temperature of 1,600° C. to 1,750° C.

9. The method of claim 8, wherein the sintering is performed for 4 hours or less.

10. The method of claim 8, wherein the sintering is performed in a nitrogen (N$_2$) gas atmosphere or a mixed gas atmosphere of nitrogen (N$_2$) and hydrogen (H$_2$).

11. The method of claim 10, wherein an amount of the hydrogen in the mixed gas atmosphere of nitrogen ($N_2$) and hydrogen ($H_2$) is in a range of 0.5 wt % to 3.0 wt % based on a total weight of the mixed gas.

12. The method of claim 7, wherein the second mixture is pre-heated prior to the molding so that a portion of the graphene oxide (GO) is reduced in the second mixture.

13. The method of claim 12, wherein the pre-heat treatment comprises heat-treating the second mixture at a temperature of 350° C. to 400° C. in an air atmosphere or a $N_2$ atmosphere.

14. The method of claim 12, wherein the heat treatment is performed for 1 hour or less.

15. The method of claim 7, wherein adding graphene oxide (GO) and carbon nanotubes (CNT), as a second additive, to the first mixture and mixing to form a second mixture comprises adding the graphene oxide (GO) and the carbon nanotubes (CNT) respectively to the first mixture in a form of an aqueous solution and mixing to form a second mixture.

16. The method of claim 7, wherein the aqueous solutions are prepared by respectively dispersing 0.5 wt % to 1 wt % of the graphene oxide and 0.5 wt % to 1 wt % of the carbon nanotubes in water.

* * * * *